United States Patent [19]

Palmer

[11] Patent Number: 5,018,924
[45] Date of Patent: May 28, 1991

[54] ROUND BALE CARRIER AND REAR UNLOADER

[76] Inventor: Karl Palmer, RD #2, Box 50, Earlville, N.Y. 13332

[21] Appl. No.: 512,847

[22] Filed: Apr. 23, 1990

Related U.S. Application Data

[63] Continuation-in-part of Ser. No. 307,678, Feb. 8, 1989, Pat. No. 4,930,958.

[51] Int. Cl.$^5$ .............................................. B60P 1/00
[52] U.S. Cl. .................................. 414/245; 298/17 R; 414/495
[58] Field of Search .................... 414/24.5, 24.6, 539, 414/525.1, 495, 911; 298/11, 17 R

[56] References Cited

U.S. PATENT DOCUMENTS

| | | | |
|---|---|---|---|
| 3,924,765 | 12/1975 | Hostetler | 414/24.5 |
| 3,942,666 | 3/1976 | Pfremmer | 414/24.5 X |
| 4,076,137 | 2/1978 | Kucera | 414/24.5 X |
| 4,415,300 | 11/1983 | Boddicker | 414/24.5 |
| 4,498,829 | 2/1985 | Spikes | 414/24.5 |
| 4,500,242 | 2/1985 | Beikman | 414/24.5 |
| 4,580,843 | 4/1986 | Lund | 414/24.5 X |
| 4,930,958 | 6/1990 | Palmer | 414/24.5 |

FOREIGN PATENT DOCUMENTS

| | | | |
|---|---|---|---|
| 0149817 | 7/1985 | European Pat. Off. | 414/24.5 |
| 2560488 | 9/1985 | France | 414/24.5 |
| 2026955 | 2/1980 | United Kingdom | 414/24.5 |
| 2080758 | 2/1982 | United Kingdom | 414/24.5 |

Primary Examiner—Frank E. Werner
Assistant Examiner—James T. Eller, Jr.
Attorney, Agent, or Firm—Randall L. Reed

[57] ABSTRACT

A farm utility wagon for carrying round or cylindrical bales with a wagon frame, wheels and axles and a superstructure, the superstructure running from the front to the rear of the wagon and centered on the center longitudinal axis of the wagon frame. The superstructure has two parallel channels running from front to rear which are formed by a center raised portion or A-frame structure and adjacent wedge shaped structures fixedly attached to the A-frame structure. The superstructure is pivotally attached to the rear of the wagon and can be raised or lowered by a hydraulic element attached to the top front of the wagon frame and the front bottom of the superstructure. When the superstructure is in a lowered position, two parallel rows of round or cylindrical bales can be loaded onto two parallel channels. When the superstructure is raised, the bales are ejected off to the rear of the wagon.

1 Claim, 4 Drawing Sheets

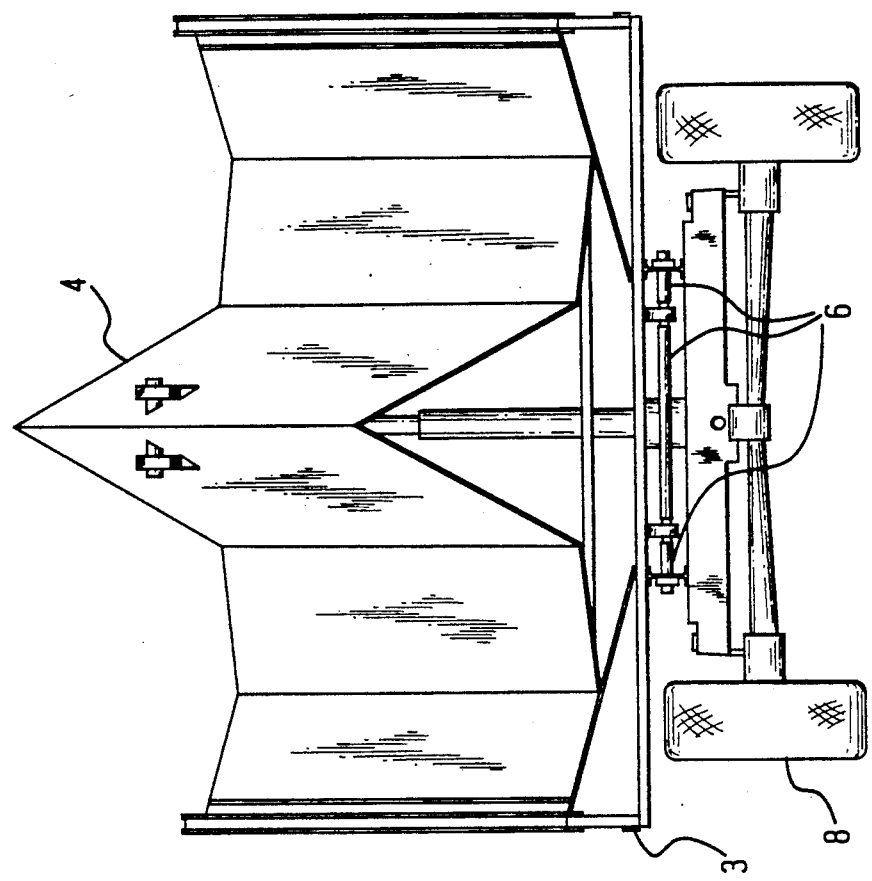
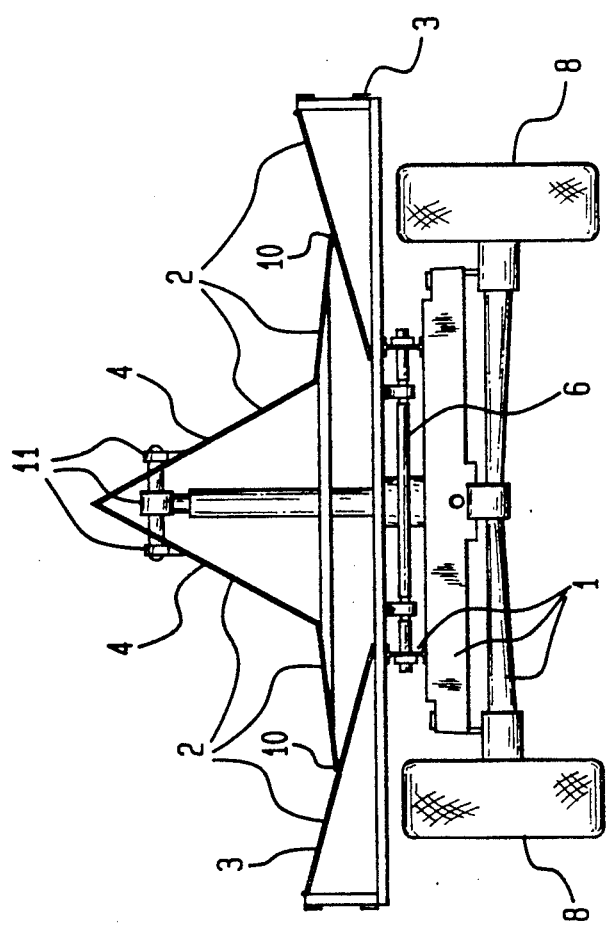

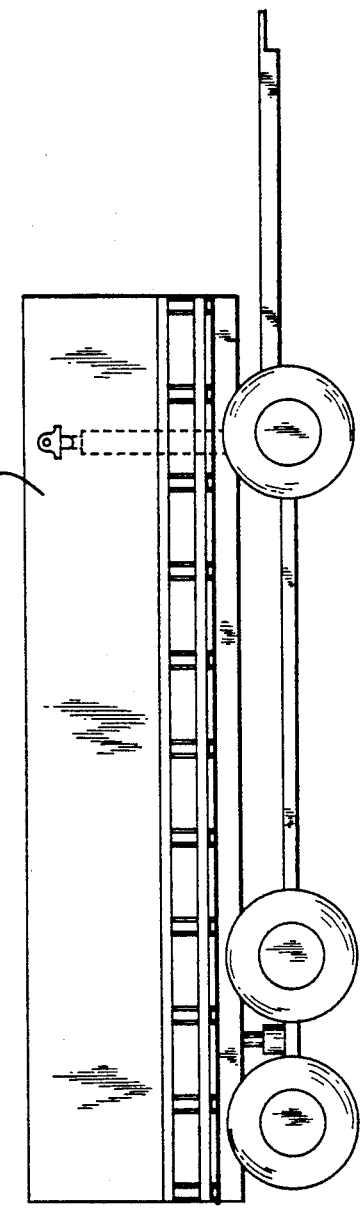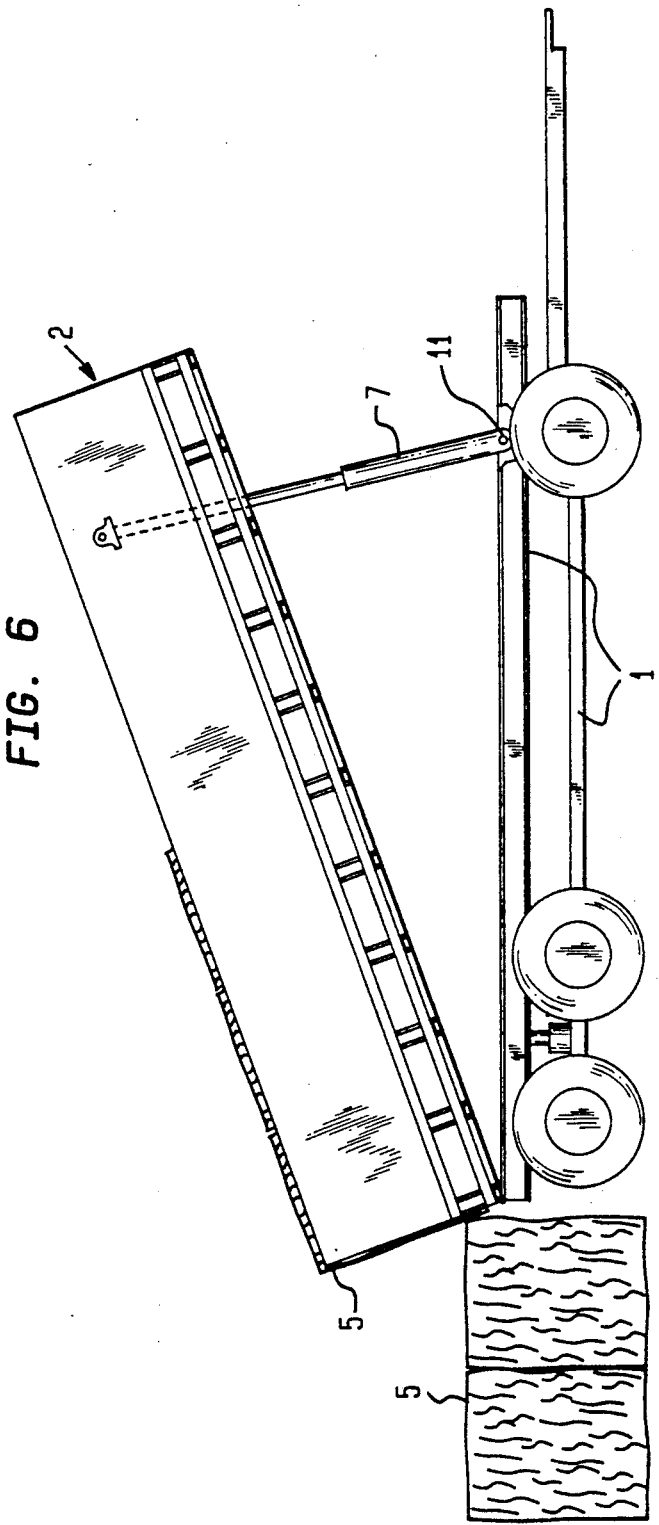

ROUND BALE CARRIER AND REAR UNLOADER

This is a continuation-in-part application of a prior application filed by the subject inventor on Feb. 8, 1989, with Ser. No. 07/307,678 now U.S. Pat. No. 4,930,958.

BACKGROUND OF THE INVENTION

1. Field of Invention

The invention described in this application is a farm utility vehicle the primary function of which is to carry and unload round or cylindrical bales of hay or similar crops. The invention also has a secondary use as a fodder or feed wagon when appropriately modified.

Farming in the past several decades in the United States has remained an economical pursuit by constant elimination and reduction of the physical labor and the associated costs required to accomplish a task. The use of machines and altering practices and techniques are some of the means of reducing labor costs. The development of round or cylindrical bales within the last 10 to 15 years is one aspect of this process. Round or cylindrical bales are 4 to 6 feet in diameter and 4 to 5 feet high, weighing anywhere from 800 to 1100 pound depending upon their density, circumference, and length. Use of large round or cylindrical bales substantially reduces labor costs. The smaller rectangular or tetrahedral shaped bales in wide spread use for the last 30 to 40 years have much higher labor costs in production, transportation, and storage. One round bale can contain the same amount of hay as 15 to 25 rectangular bales. However, large round bales, because of their weight and size are extremely hard to move to an appropriate storage site for protection from the elements while awaiting use. Numerous attempts have been made to resolve this problem. The invention described herein is one successful resolution of that problem.

Description of Prior Art

U.S. Pat. No. 4,500,242 by Beikman appears to be the closest prior art in which two rows of parallel bales are carried in semi-cylindrical frame baskets which baskets are pivoted by hydraulic means to the side to unload the bales. U.S. Pat. No. 4,549,840 by Ansbjer carries a single row of cylindrical bales in a U-shaped carrier and unloads them by pushing the bales off the end. U.S. Pat. No. 4,580,842 by Lund is a bale rack which carries two rows of parallel bales with a divider running down the center; the bales are unloaded to the side of the wagon by releasing a restraining rail or device which runs along the outside of each row. A good number of other devices have been patented for transportation and unloading of round bales but are substantially different.

SUMMARY OF THE INVENTION

The purpose of this invention is to provide a means of conveyance of large round or cylindrical bales from the place of production to an appropriate place of storage and a convenient means for unloading the bales with as little labor and investment in machinery as possible. Other uses will be obvious to those who are familiar with the art.

The basic invention consists of a wagon frame with one or more axles and wheels attached to provide mobility. The wagon frame has a central longitudinal axis running from the center of the front of the frame to the center of the rear. A single piece superstructure is mounted on the wagon frame and centered and parallel to the wagon frame and its central longitudinal axis.

The superstructure consists of a center raised structure in the form of a A-frame or prism which forms, with two adjacent and parallel wedge shaped structures which are on either side edge of the wagon and slant in toward the center of the wagon, two parallel channels. The wedge shaped structures are fixedly attached to the center raised structure or A-frame. The superstructure is unattached to the wagon frame except for pivot means at the rear of the wagon frame and the superstructure. A hydraulic cylinder or other means of raising and lowering the superstructure is attached to both the top front of the wagon frame and the front bottom of the superstructure.

When the superstructure is in the lowered position, two parallel rows of round bales can be placed in the two parallel channels.

The wagon by means of one or more axles or wheels attached to it can be moved by a tractor or other means of mobility to a suitable place for storage of the round bales. The bales then can be unloaded by extending the hydraulic cylinder and pivoting the superstructure at its rear allowing the bales to slide or fall off to the rear of the wagon.

The invention can be modified by the addition to the sides of the wagon of ladder like devices which act as stanchions and allow the devise to be used as a mobile feed wagon.

DESCRIPTION OF THE DRAWING

The following drawings more clearly illustrate the invention.

FIG. 2 a view of the wagon from the front with the hydraulic cylinder fully retracted.

FIG. 3 a rear view of the wagon with the hydraulic cylinder fully extended and the superstructure pivoted up on its rear pivot.

FIG. 5 side view of one embodiment of the wagon with the superstructure in a lowered position and the hydraulic cylinder fully retracted.

FIG. 6 another side view of the superstructure with the hydraulic cylinder fully extended and the superstructure pivoted up on its rear pivot.

DESCRIPTION OF THE PREFERRED EMBODIMENT

Figure 1:
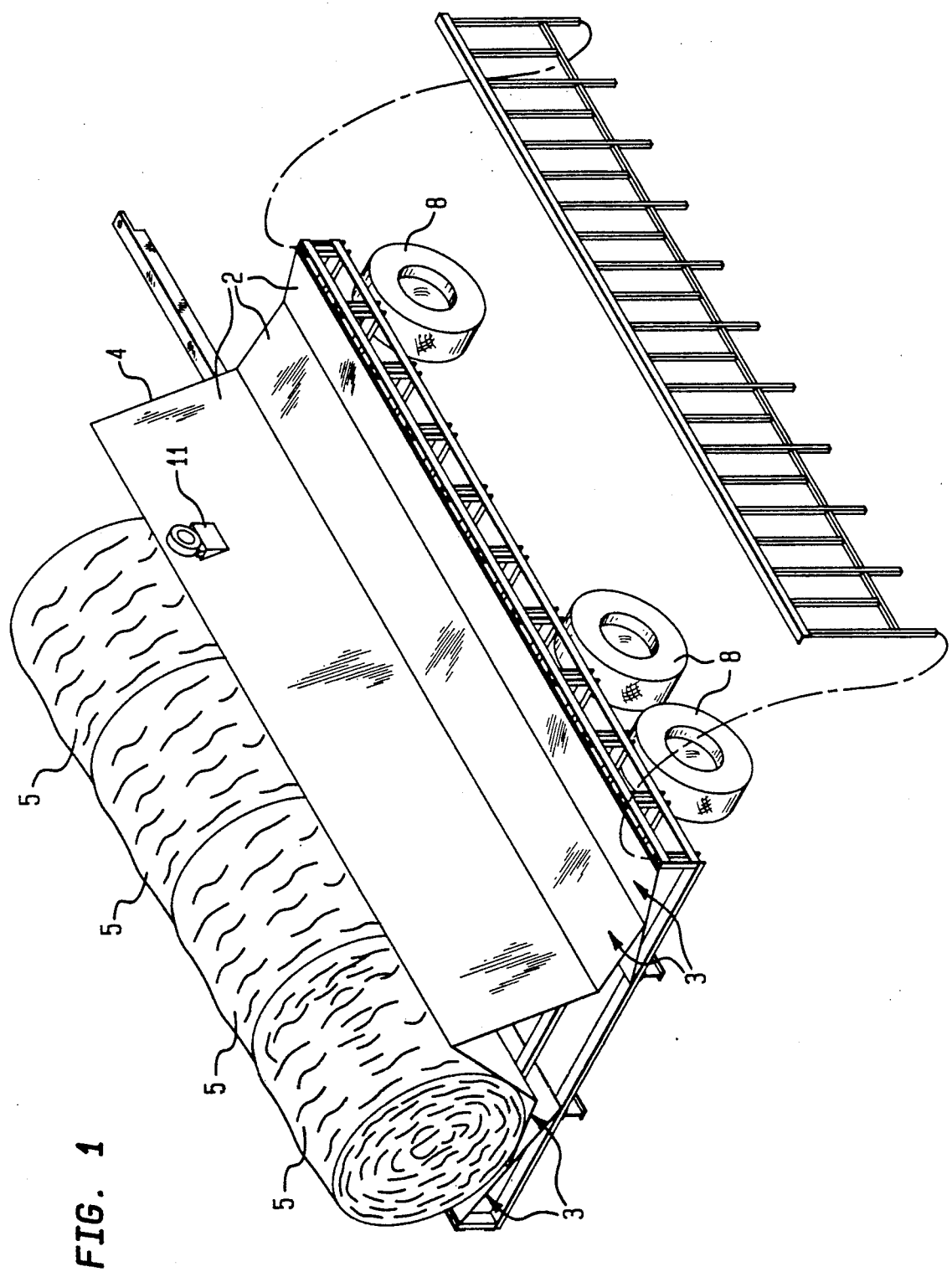
FIG. 1 an elevated view from the right rear portion of the wagon with one of the channels filled with a row of round bales the other empty.

The preferred embodiment of the invention is set forth in detail in the attached drawings. FIG. 1 shows the complete wagon with one row of round bales (5) in one of two parallel channels to be described in more detail below. The wagon consists of a wagon frame (1). On top of the wagon frame running along its central longitudinal axis (the central longitudinal axis runs from the front center of the wagon to the rear center of the wagon) and covering the entire top of the wagon is a superstructure (2) which consists of a center raised portion (4) which has fixedly attached to it on either side two wedge shaped structures (3). The wedge shaped structures together with the center raised portion form two parallel channels. The superstructure is aligned and centered on the central longitudinal axis of the wagon. The center raised portion (4) in the preferred embodiment is in the shape of an A-frame or prism.

Figure 4:
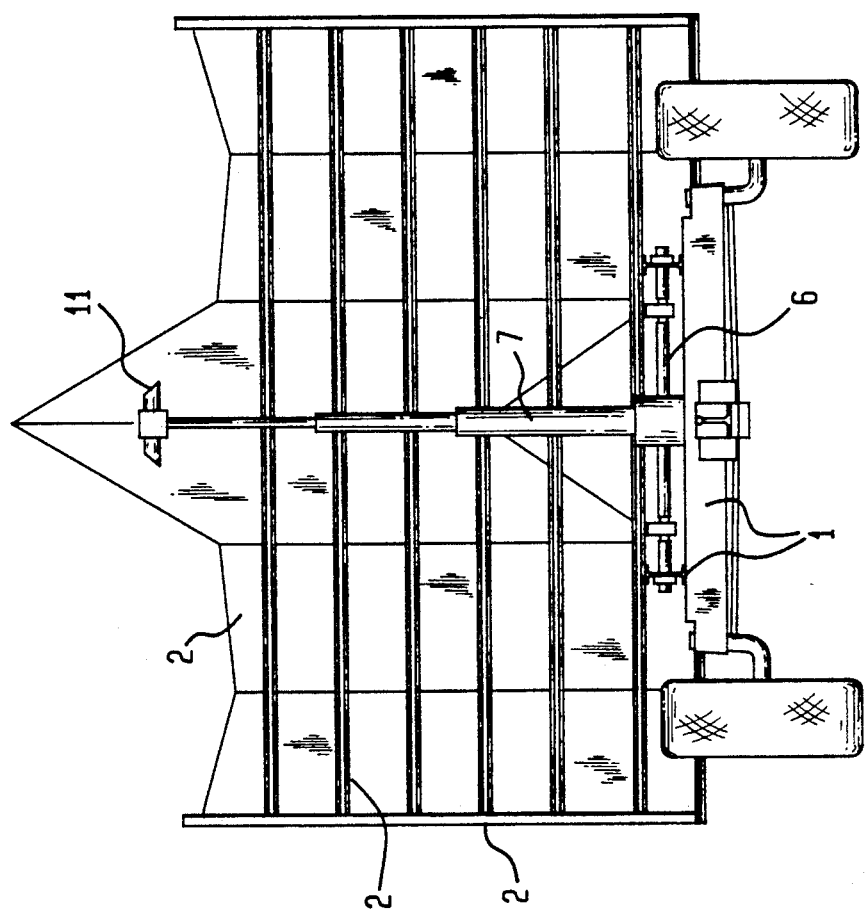
FIG. 4 a front view of the wagon with the hydraulic cylinder fully extended and the superstructure pivoted up on its rear pivot.

The superstructure is pivotally attached at its rear to the rear of the wagon by a pivot or pivot means (6) but is not directly attached to the rest of the wagon and can be pivoted up and down on this pivot (6). The pivot in the preferred embodiment would consist of a hinge like structure. The means for pivoting the superstructure up and down on the rear pivot in the preferred embodiment would be a hydraulic cylinder (7) attached to the front top of the wagon frame and to the front bottom of the superstructure (2), FIGS. 4 and 6 best illustrate this. FIGS. 3, 4 and 6 show the hydraulic cylinder (7) fully extended and the superstructure (2) raised at its front to its fullest height. FIGS. 1, 2, 4, and 6 show the superstructure resting on the wagon and the hydraulic cylinder (7) fully retracted. The hydraulic cylinder itself is attached to the superstructure and the wagon frame by pivots (11) to allow free movement of the hydraulic cylinder when it is being extended and retracted. In the preferred embodiment the pivots would be hinge like structures as illustrated in the drawings. Also the hydraulic cylinder (7) can have just two sections or it could be a telescoping cylinder of 3 or more sections, such as a three or four stage hydraulic cylinder (7).

The wagon is taken or pulled into an appropriate field where round bales have been produced by appropriate machinery. While the superstructure (2) is in its lowered position the round bales are pushed into one of the two parallel channels (10) with the curved portion of the bale resting in the channel with the flat end portion of the bale perpendicular to the central longitudinal axis of the wagon as shown in FIG. 1. As each successive bale is added to the wagon by a tractor with a forklift or other means, the bales that have already been put into the channels are pushed forward until a full load of two parallel rows of round bales are on the wagon. The wagon then can be towed to an appropriate place where the round bales will be stored. Using suitable means to power the hydraulic cylinder can be extended and the bales can slide or drop off the rear of the wagon.

Power for the hydraulic cylinders (7) in the preferred embodiment would be provided through hydraulic lines running from a tractor or other means of mobility to the hydraulic cylinders.

The proceeding is the preferred embodiment of this apparatus, however, modifications can be made to it without departing from the basic idea of the invention.

I claim:

1. A round bale hauler and unloader comprising:
a wagon frame with a central longitudinal axis; one or more axles secured to the frame; wheels rotatably attached to said one or more axles for support and movement; a single piece superstructure aligned and parallel to the central longitudinal axis of the wagon frame and extending from the front to the rear of the wagon frame, the superstructure having a center A-frame and adjacent wedge shaped structures which are fixedly attached to the A-frame and which together with the A-frame form two parallel side by side channels; pivot means at the rear of the superstructure for attaching the superstructure to the rear of the wagon frame; and a hydraulic cylinder attached to the front bottom of the superstructure and the front top of the wagon frame to raise the front of the superstructure above the wagon frame and lower it onto the wagon frame pivoting the superstructure on its rear pivot means, such that when the hydraulic cylinder is fully retracted, the superstructure is in a lowered position and the two parallel channels can be filled with round bales whose axes are aligned parallel to the central longitudinal axis, and such that when the hydraulic cylinder is fully extended, the front of the superstructure is pivoted up about the rear pivot means, thereby causing the two parallel rows of round bales to slide off the rear of the wagon.

* * * * *